US010197675B2

(12) United States Patent
Montgomery et al.

(10) Patent No.: US 10,197,675 B2
(45) Date of Patent: Feb. 5, 2019

(54) SYSTEM AND METHOD FOR CAMERA BASED POSITION AND ORIENTATION MEASUREMENT

(71) Applicant: Hilti Aktiengesellschaft, Schaan (LI)

(72) Inventors: Paul Yalden Montgomery, Menlo Park, CA (US); Andreas Winter, Feldkirch (AT); Till Cramer, Jenins (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 15/027,994

(22) PCT Filed: Oct. 7, 2014

(86) PCT No.: PCT/US2014/059418
§ 371 (c)(1),
(2) Date: Apr. 7, 2016

(87) PCT Pub. No.: WO2015/054194
PCT Pub. Date: Apr. 16, 2015

(65) Prior Publication Data
US 2016/0238706 A1 Aug. 18, 2016

(51) Int. Cl.
*G01C 3/08* (2006.01)
*G01S 17/02* (2006.01)
(Continued)

(52) U.S. Cl.
CPC ........... *G01S 17/023* (2013.01); *F16M 11/08* (2013.01); *F16M 11/18* (2013.01); *G01S 5/163* (2013.01);
(Continued)

(58) Field of Classification Search
CPC ........ G01S 17/023; G01S 5/163; G01S 17/42; G01S 17/875; F16M 11/08; F16M 11/18; G03B 17/561; G03B 37/00
See application file for complete search history.

(56) References Cited

U.S. PATENT DOCUMENTS 5,072,396 A 12/1991 Fitzpatrick et al.
5,444,902 A 8/1995 Casturo et al.
(Continued)

FOREIGN PATENT DOCUMENTS

EP 1 573 271 B1 2/2008
JP 61-117409 A 6/1986
(Continued)

OTHER PUBLICATIONS

3rdTech, Inc., "HiBall-3100 Wide-Area Tracker and 3D Digitizer—6 DOF Position and Orientation with Unparalleled Precision and Performance", 2006, 2 pages.
(Continued)

*Primary Examiner* — Samantha K Abraham
(74) *Attorney, Agent, or Firm* — Crowell & Moring LLP

(57) ABSTRACT

A system and a method for determining a position and an orientation of an object relative to a defined reference frame is disclosed. A plurality of targets are disposed at known locations relative to the defined reference frame. A head assembly is disposed on the object, where the head assembly includes a plurality of cameras. The head assembly determines the position and the orientation of the object from location data associated with the plurality of targets and image data from the plurality of cameras.

26 Claims, 11 Drawing Sheets

(51) Int. Cl.
  *G01S 17/42* (2006.01)
  *F16M 11/08* (2006.01)
  *F16M 11/18* (2006.01)
  *G01S 17/87* (2006.01)
  *G01S 5/16* (2006.01)
  G03B 17/56 (2006.01)
  G03B 37/00 (2006.01)

(52) U.S. Cl.
  CPC ............ *G01S 17/42* (2013.01); *G01S 17/875* (2013.01); *G03B 17/561* (2013.01); *G03B 37/00* (2013.01)

(56) References Cited

U.S. PATENT DOCUMENTS

| | | |
|---|---|---|
| 6,997,387 B1 | 2/2006 | Hepworth et al. |
| 7,092,109 B2 | 8/2006 | Satoh et al. |
| 7,720,554 B2 | 5/2010 | DiBernardo et al. |
| 8,087,176 B1 | 1/2012 | Hayes et al. |
| 8,290,726 B2 | 10/2012 | Schmidt et al. |
| 8,803,073 B2 | 8/2014 | Philippi |
| 9,858,712 B2 | 1/2018 | Stathis |
| 2009/0289120 A1 | 11/2009 | Hanson |
| 2009/0290019 A1 | 11/2009 | McNelis et al. |
| 2009/0323121 A1* | 12/2009 | Valkenburg .......... G01B 11/002 358/1.18 |
| 2010/0176270 A1 | 7/2010 | Lau et al. |
| 2011/0013200 A1 | 1/2011 | Kato |
| 2011/0192227 A1 | 8/2011 | Post et al. |
| 2012/0008136 A1 | 1/2012 | Jaeger et al. |
| 2012/0236290 A1 | 9/2012 | Eisele et al. |
| 2012/0236320 A1 | 9/2012 | Steffey et al. |

FOREIGN PATENT DOCUMENTS

| | | |
|---|---|---|
| JP | 6-131446 A | 5/1994 |
| JP | 10-38513 A | 2/1998 |
| JP | 2002-156229 A | 5/2002 |
| JP | 2002-243446 A | 8/2002 |
| JP | 2006-266891 A | 10/2006 |
| JP | 2010-540796 A | 12/2010 |
| JP | 2011-242479 A | 12/2011 |
| JP | 2012-117866 A | 6/2012 |
| JP | 2012-522661 A | 9/2012 |
| JP | 2012-196749 A | 10/2012 |
| WO | WO 02/086420 A1 | 10/2002 |
| WO | WO 2004/057269 A1 | 7/2004 |

OTHER PUBLICATIONS

"Tech Watch—On the Right Track", *Computer Graphics World*, Apr. 2000, 2 pages.
Welch, "SCAAT: Incremental Tracking with Incomplete Information", TR96-051 Oct. 1996, Department of Computer Science, UNC—Chapel Hill, 208 pages.
Welch et al., "SCAAT: Incremental Tracking with Incomplete Information", University of North Carolina at Chapel Hill, 12 pages.
Welch et al., "The HiBall Tracker: High-Performance Wide-Area Tracking for Virtual and Augmented Environments", *Symposium on Virtual Reality Software and Technology*, 1999, University College London, Dec. 20-22, 1999, pp. 1-11.
Welch et al., "High-Performance Wide-Area Optical Tracking—*The HiBall Tracking System*", *Presence: Teleoperators and Virtual Environments* (10:1), Feb. 2001, pp. 1-22.
PCT/US14/59418, International Search Report (PCT/ISA/220 and PCT/ISA/210) dated Aug. 27, 2015, enclosing Written Opinion of the International Searching Authority (PCT/ISA/237) (Ten (10) pages).
U.S. Patent Application, "Method and Device for Determining the Position Coordinates of a Target Object", U.S. Appl. No. 14/654,418, filed Jun. 19, 2015, Christoph Wuersch et al.
U.S. Patent Application, "Method and Device for Determining the Two-Dimensional Positional Coordinates of a Target Object", U.S. Appl. No. 14/654,439, filed Jun. 19, 2015, Torsten Gogolla et al.
U.S. Patent Application, "Method and Device for Determining the Position Coordinates of a Target Object", U.S. Appl. No. 14/654,434, filed Jun. 19, 2015, Torsten Gogolla et al.
European Search Report issued in European counterpart application No. 14851781.6-1751/3055649 dated May 23, 2017 (Six (6) pages).
Japanese Notification of Reasons for Rejection issued in Japanese counterpart application No. 2016-522012 dated Jun. 27, 2017 (Ten (10) pages).

\* cited by examiner

SYSTEM AND METHOD FOR CAMERA BASED POSITION AND ORIENTATION MEASUREMENT

BACKGROUND OF THE INVENTION

In many practical applications it is desired to know the position and orientation (the pose) of an object. In many outdoor applications, Global Navigation Satellite System (GNSS) is used to derive these measurements with an accuracy of approximately one centimeter in position and sub degree in orientation and with an independent update rate of up to 20 Hz. There are many examples of this technology used in farming, mining, and survey applications. Unfortunately, GNSS based measurement techniques fail when the applications must occur indoors or in an area where satellite signals are blocked in many directions.

A further system is known where the position and orientation of an object is determined using a laser range finder, an azimuth angle encoder, and an elevation angle encoder. The laser beam of the laser range finder, or optionally a pointer beam, is directed onto the center of the object and a range measurement is sampled. The alignment of the beam is facilitated by a telescope or camera with a field of view that is aligned with the laser beam and sensitive to the laser wavelength. Additionally, azimuth and elevation angles are sampled. The position and orientation of the object is calculated from the distance and the azimuth and elevation angles. However, this system is inefficient.

Therefore, there is a need for an improved system and method for determining the pose of an object.

SUMMARY OF THE INVENTION

A system and a method for determining the position and orientation of an object relative to a defined reference frame is disclosed. A plurality of targets are disposed at known locations relative to the defined reference frame. A head assembly is disposed on the object, where the head assembly includes a plurality of cameras. The head assembly determines the position and the orientation of the object from location data associated with the plurality of targets and image data from the plurality of cameras.

DETAILED DESCRIPTION OF THE DRAWINGS

Figure 1:
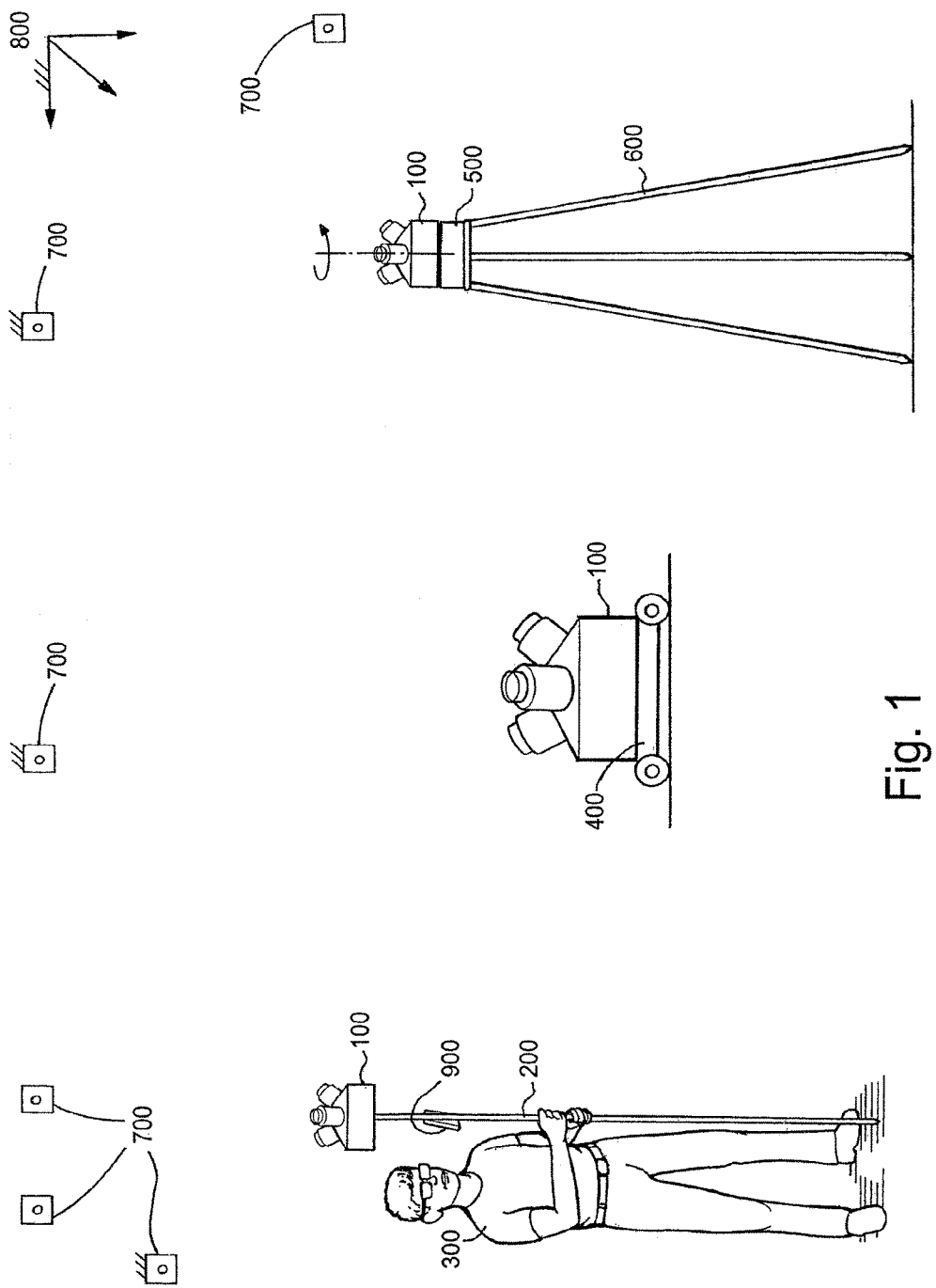
FIG. 1 illustrates three embodiments of a Position and Orientation Measurement Engine (POME) system in accordance with the principles of the present invention.

The present invention includes a system and a method for using a set of mobile cameras and a set of installed or projected targets to enable position and orientation measurements of an object with high accuracy and high update rate. These measurements are enabled both indoors and outdoors and may be used in a large number of applications. Applications may be categorized by their dynamics, e.g., static, quasi-static, and kinematic, in the operational mode. Additionally, the present invention includes novel techniques for rapid and accurate survey of a set of installed targets (survey mode) and for the internal and external calibration of the POME head assembly (calibration mode).

Most basically, in an embodiment, the POME system uses cameras to measure angles to targets. The locations of the targets are known in the coordinate frame of the working volume. By knowing the angles to the targets, the intersection of the angles provides the position of an object that is co-located with the cameras. Thus, by using the lens model, target locations, and the camera assembly geometry (target angles), the pose of an object (on the POME head assembly) can be calculated in the work space.

As will also be further discussed below, each camera target image provides an x and a y image plane measurement. For optimum pose determination, it is best to estimate 3 position and 3 orientation unknowns. Therefore, a minimum of three targets are used to calculate the six unknowns of camera pose.

In the system and method of the present invention, a set of targets is provided at known locations in a world frame and images of those targets are provided in photographic images. The pose of the camera is then calculated in the world frame. As discussed above, the available measurements are the x and y locations of each target in the image. As will be further discussed below, the calculation unambiguously associates an image location with a specific target (registration).

The final calculation can account for errors in the system due to, for example, measurement accuracy, camera lens distortion, etc. A weighted least squares estimation, which employs an error model with error factor inputs, can be used to more accurately determine the pose when accounting for these errors.

Thus, as will be further discussed below, in an embodiment, the computation to achieve the pose of an object includes determination of the target image locations in the image plane (centroid determination), identification of which image corresponds to which target (registration), least squares determination of the pose, and possible filtering against prior knowledge or additional sensors such as MEMs inertial sensors.

Further details of the system, and alternative embodiments, will be discussed below.

The System of the Present Invention

The mobile component of the system consists of a set of wide angle cameras attached with known geometry to a central assembly. The assembly may also include other instruments such as inertial or laser ranging or photosensitive components, as well as electronics, battery and computation hardware and software for real time pose determination. This assembly is the POME head assembly.

The infrastructure component of the system consists of a set of installed and/or projected targets. Targets may be a combination of active or passive, or projected, targets and are attached to, or projected on to, internal surfaces at known locations relative to a defined reference frame. The limits of the working volume are defined by the three dimensional region where targets are visible and allow for pose determination that meets a defined accuracy specification.

In addition to active, passive, and projected targets, the targets may be a physical feature of a room or space, for example. Thus, the target would be a natural feature of the room or space and would not need to be attached to, or projected on to, an internal surface. Further, because the target is a physical feature of the room or space, the location of the physical feature would be known or could be easily determinable. As an example, acoustic tiles in the ceiling of a room are generally held in place by a support grid. The corners of the grid blocks that support the individual tiles could be targets. Not only could these natural features serve as the targets themselves, but they could also be used in verifying the locations of other types of targets and for relevancy of measurements.

The survey component of the system consists of a rotation accessory that works with the POME head assembly to enable rapid and accurate survey of the set of installed and/or projected targets. This survey component will be referred to herein as the survey accessory.

The calibration component of the system consists of a rotation accessory that works with the POME head assembly to enable rapid and accurate calibration. Calibration involves estimation of an internal projection model for each camera and lens (per camera internal calibration). Additionally, it involves estimation of the orientation and translation of each camera and a laser ranging source relative to the assembly frame (external calibration). This assembly will be referred to herein as the calibration fixture.

The Methods of the Present Invention

The operational method includes real time procedures and algorithms to identify and disambiguate targets from noise, interference and multipath and to use camera based measurements to estimate the pose of the assembly frame. Measurements from micro-electro-mechanical systems (MEMs) and photodiodes may also be used. It also enables variance bounds to be estimated for the assembly frame pose.

The survey method includes procedures and algorithms to collect and process a set of camera and laser ranging measurements to determine the locations of targets in a coordinate frame and to relate this coordinate frame to a building coordinate frame. It also enables variance bounds to be estimated for the target locations.

The calibration method includes procedures and algorithms to capture and process data to accurately determine an internal projection model for each camera and lens and the translation and orientation parameters for the camera and laser components relative to the assembly frame. It also enables variance bounds to be estimated for these parameters.

FIG. 1 illustrates three different POME system embodiments, each of them operating simultaneously with the infrastructure component. The working volume is populated with six targets 700, attached at various locations to surfaces of the working volume. The coordinate frame of the working volume is identified by reference character 800. The locations of all targets 700 are known in this coordinate frame 800 and the pose calculation is relative to this coordinate frame.

On the left of FIG. 1 is a POME head assembly 100 mounted on a survey pole 200. This illustrates the POME system operating in a kinematic mode, with real time pose tracking of the survey pole. As the human operator 300 moves the survey pole 200 within the workspace, the POME system determines the location of the survey pole tip. The location or location error relative to a desired point can be displayed to the operator with a mobile display 900.

At the center of FIG. 1 is a POME head assembly 100 mounted on a mobile robotic device 400. A robotic fork lift or cleaning robot are examples of the mobile robotic device. This illustrates the POME system operating in a kinematic mode, with real time pose tracking of the mobile robotic device.

At the right of FIG. 1 is an assembly that includes a POME head assembly 100 and a rotation accessory 500. The assembly is mounted on a survey tripod 600. This illustrates the POME system operating in a static mode. The use of a rotation accessory in the static mode can increase the pose accuracy by enabling a large number of independent camera measurements as the POME head is rotated in increments.

Each of the modes illustrated in FIG. 1 may be referred to as the operational mode of the POME system.

Figure 2:
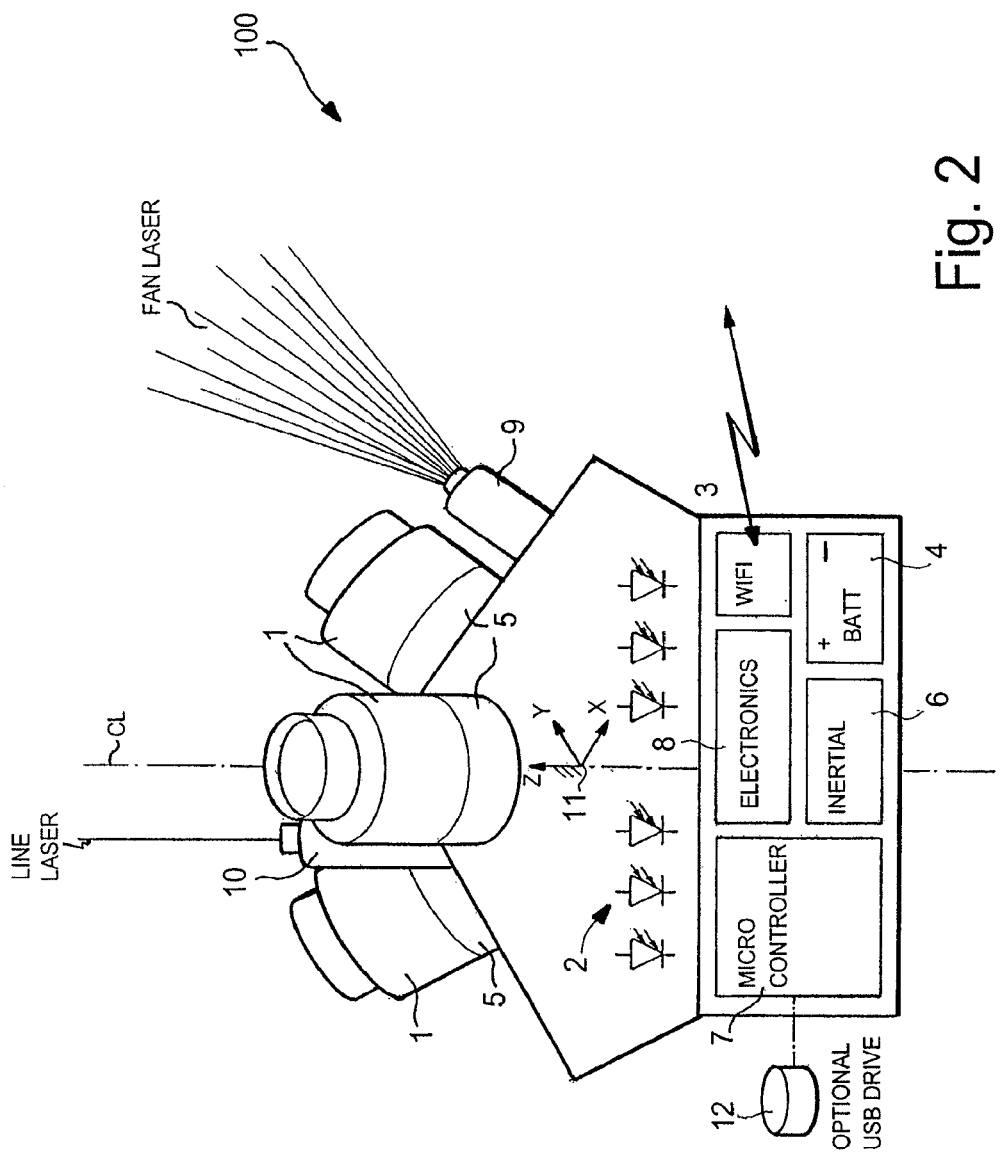
FIG. 2 illustrates an embodiment of a POME head assembly of the present invention.

FIG. 2 shows a diagram of a POME head assembly 100. The assembly consists of an assembly frame or housing 11, to which are fixed several components, described below.

One or more cameras/lens assemblies 1 are included. The set of cameras are arranged to achieve a combined field of view (FOV) that encompasses the set of visible targets. The combined field of view is greater than the field of view of any single camera. In many cases where targets are distributed in all directions, the desired combined FOV is greater than a hemisphere. In one embodiment, three cameras are arranged in a tetrahedral arrangement, so that the principal axes of the three cameras are aligned orthogonal to the upward looking planes of a regular tetrahedron. In this embodiment, each camera must have a FOV greater than 150 degrees to ensure that there are no gaps in the upward looking hemisphere. Alternate arrangements of cameras may be applicable for other applications. Typically, it is desired to minimize the number of cameras while achieving an overlapping field of view.

Each camera/lens assembly includes an imaging sensor and associated electronics 5 for data decimation. To achieve a wide field of view and high accuracy, a large image sensor is employed. Image sensors with more than 5 million pixels are possible. Depending on the design of the targets, cameras may be monochrome or color. In a preferred embodiment, active targets emit with a wavelength in the near IR spectrum, and monochrome cameras are employed with optical filters to mitigate the effect of out of band interference. To achieve a 10 Hz update rate, the camera exposure intervals are optimally synchronized and the image data from all cameras are processed simultaneously. This implies a high data rate that must be handled in the image processing hardware and software. If active targets are synchronized, it may be further necessary to synchronize the camera exposure intervals with the target time base.

Further included in POME head assembly 100 is a plurality of photodiodes 2. Associated with each photodiode are electronics 8 for powering and demodulating signals received at the photodiode. The purpose of the photodiodes is to determine by analog demodulation which set of targets among the plurality of all targets is visible in the field of view of the photodiode. The use of the photodiodes as described is used to determine a coarse pose estimate, which will be described in more detail later in this specification.

The coarse pose estimate is used to narrow the set of candidate solutions in the precise pose calculation based on the decimated data samples.

A wireless communications module 3, a battery 4 capable of providing electrical power, an inertial sensor package 6, a programmable micro-controller 7, an optional fan beam laser module 9, an optional point beam laser or laser ranging module 10, and a removable external data storage device 12, such as a USB thumb drive, are also included.

The sensor components are fixed rigidly to the assembly frame or housing 11 to ensure stability after calibration. The POME head assembly 100 is able to be mounted to a variety of accessories, including the rotation and survey accessories.

The POME head assembly includes, as discussed above, inertial measurement sensors. In a preferred embodiment, a dextral triad of MEMs based gyroscopes and a dextral triad of MEMs based accelerometers are employed. The purpose of the inertial measurement sensors is to provide dead reckoning over short time intervals when optical measurements become unavailable or corrupted, as will be further discussed later in this specification. The inertial measurement sensors may be used to enable operational mode switches. For example, for switching the POME system from a kinematic mode to a static mode.

Figure 3:
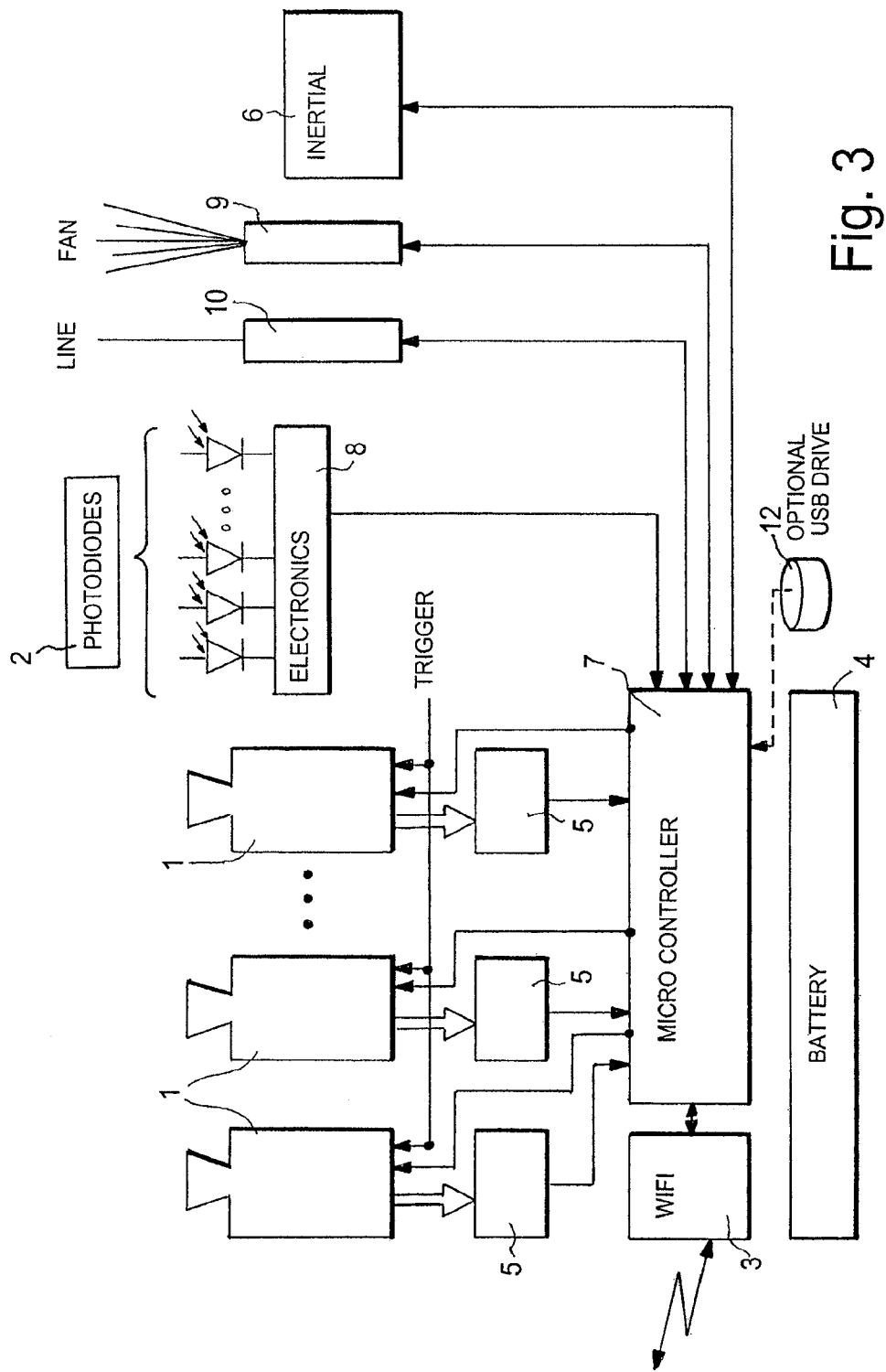
FIG. 3 shows a flow of data in the POME head assembly.

FIG. 3 illustrates the POME head data flow and shows the flow of data from the sensor components to the computer and communications components. In a preferred embodiment, exposures on all cameras 1 are synchronized by a hardware trigger. The hardware trigger may be derived from a variety of sources. For example, a programmable timer on a micro-controller may be used.

Command and configuration data flows from the programmable micro-controller 7 to each of the cameras. Command and configuration data flows from the programmable micro-controller 7 to the inertial sensor package 6. Command and configuration data also flows from the programmable micro-controller 7 to the fan laser package 9 and/or the line laser package 10.

High volume data samples from each camera/lens assembly 1 are filtered by data decimation electronics 5, and the decimated data samples are inputs to the micro-controller 7. Inputs are transmitted over an on-board serial or parallel communications channel or bus.

Data samples from the inertial sensors 6 are input to the micro-controller 7, typically over a serial or USB data communications channel.

Data samples from the photodiode electronics 8 are input to the micro-controller 7, typically over a serial or USB data communications channel.

Data samples from the fan laser package 9 and/or line laser package 10 are input to the micro-controller 7, typically over a serial or USB data communications channel.

The micro-controller 7 can communicate with the external world via the two-way wireless communications module 3.

The micro-controller 7 can record/retrieve data using a removable external data storage device 12, such as the USB thumb drive. The recording device is not typically used during the operational mode. It is used to save sensor data during survey and calibration processes for subsequent batch processing.

Figure 4:
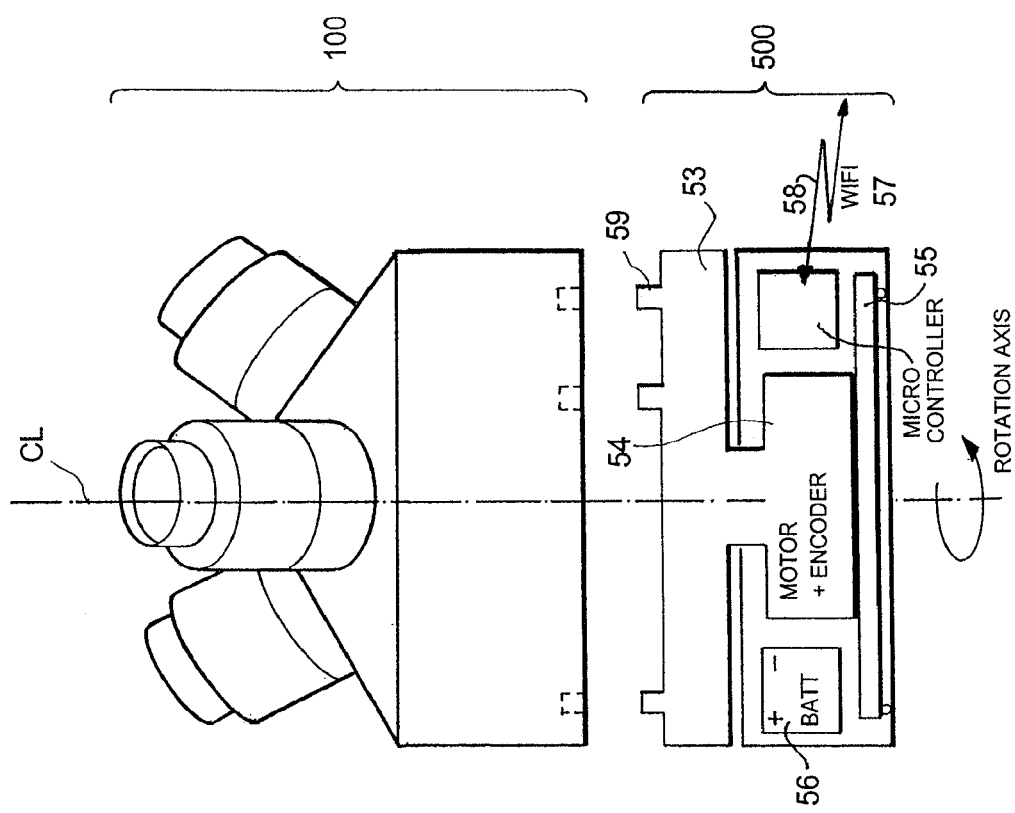
FIG. 4 illustrates an embodiment of a rotation accessory of the present invention.

FIG. 4 shows an assembly diagram of the rotation accessory 500. The rotation accessory 500 can be connected to the POME head assembly 100, and functions to rotate the POME head assembly 100 in increments about a vertical axis of rotation.

In the static operational mode, the rotation accessory 500 can improve the pose accuracy by collecting a large number of independent camera measurements over one or more full rotations of the POME head assembly 100.

During calibration, the rotation accessory is necessary to rotate the POME head assembly to sample a set of known targets at many locations in the image planes of all cameras in the POME head assembly. In both these cases, it is necessary to know the azimuth angular increments with high precision, although precise motor control is not required.

The rotation accessory 500 consists of a rotation platter 53, to which the POME head assembly 100 is attached via registration features 59. The rotation platter 53 is attached to the shaft of a stepper motor with angle encoder 54. The stepper motor can rotate the rotation platter 53 and attached POME head assembly 100 relative to the rotation accessory base. High precision in the motor drive is not necessary, however, the angle encoder should be sufficient to measure angular increments A between successive azimuth stations with precision better than 10 arcsec.

The stepper motor with angle encoder 54 is mounted on a self-leveling platform 55 which operates to ensure that the stepper motor axis of rotation is aligned with the local gravity vector. The stepper motor and leveling platform are controlled by a programmable micro-controller 57.

The programmable micro-controller 57 can communicate via a wireless communications module 58 to a second wireless communications module external to the rotation accessory.

A battery 56 is capable of providing electrical power to all rotation accessory components.

Figure 5:
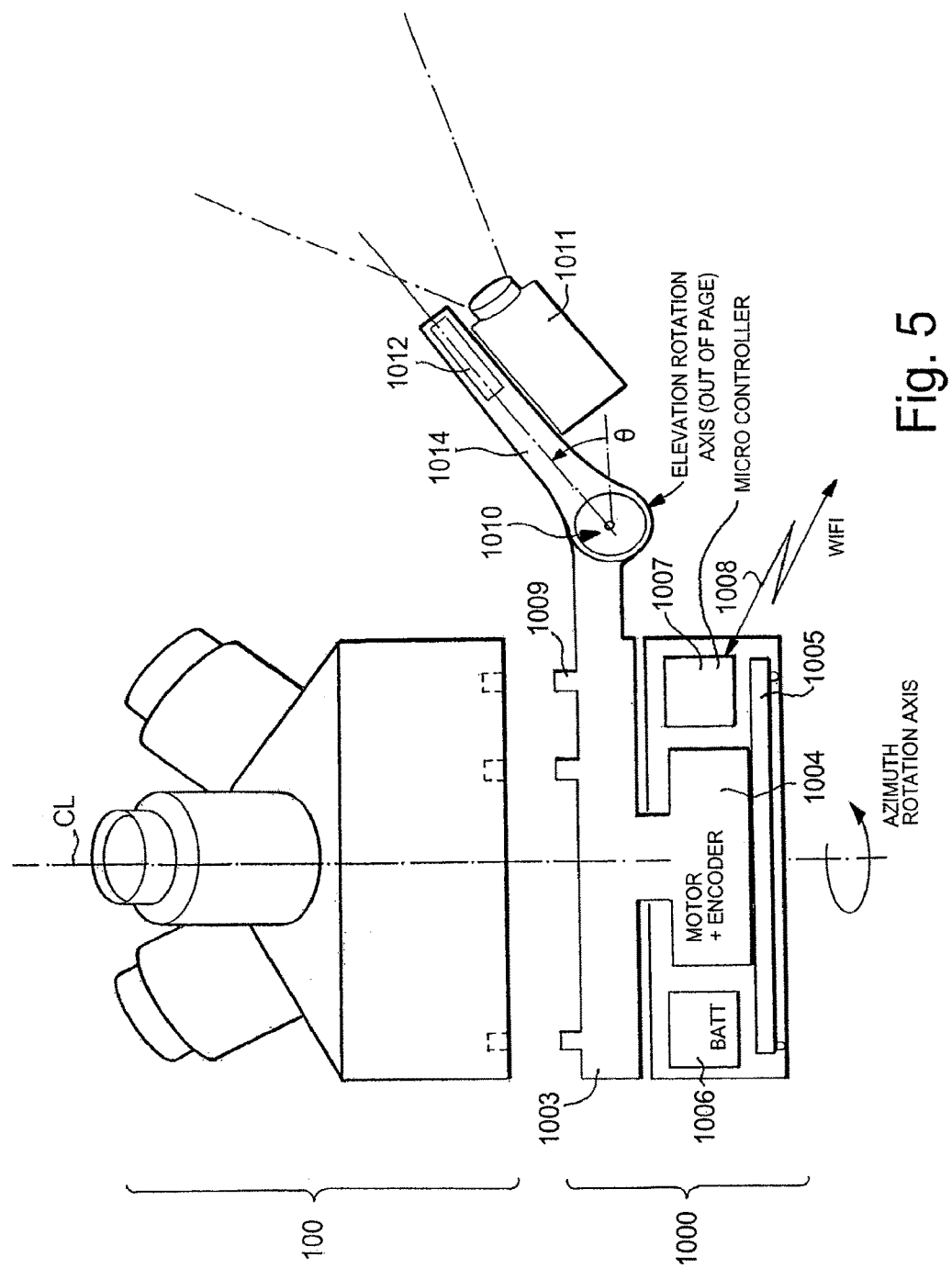
FIG. 5 illustrates an embodiment of a survey accessory of the present invention.

FIG. 5 shows an assembly diagram of the survey accessory 1000. The survey accessory 1000 can be connected to the POME head assembly 100, and functions to rotate the POME head assembly about a vertical axis of rotation. The survey accessory is similar to a rotation accessory 500 with the addition of a computer controlled elevation platform 1014.

The survey accessory 1000 is employed with the POME head assembly 100 during survey mode to collect data samples sufficient to calculate the target location database. The combination of azimuth axis control and elevation axis control enable a laser range finder spot beam to be targeted at each target in turn. Target localization is achieved via a computer controlled search using optical feedback from a narrow FOV target feedback camera 1011.

The survey accessory consists of a rotation platter 1003, to which the POME head assembly 100 is attached via registration features 1009. The rotation platter 1003 is attached to the shaft of a stepper motor with angle encoder 1004. The stepper motor can rotate the rotation platter 1003 and attached POME head assembly 100 relative to the survey accessory base. High precision in the motor drive is necessary to allow the laser range finder 1012 to be directed at the center of a target using feedback control from the target feedback camera 1011. The azimuth angle encoder should be sufficient to measure angular increments $\Delta\psi$ from a starting location with precision better than 10 arcsec.

The stepper motor with angle encoder 1004 is mounted on a self-leveling platform 1005 which operates to ensure that the stepper motor axis of rotation is aligned with the local gravity vector.

The components described above for the survey accessory can be the same components described previously for the rotation assembly 500. Thus, the components below for the survey accessory can be used with the rotation assembly 500 as a survey accessory.

The elevation platform 1014 of the survey accessory can rotate about a horizontal axis relative to the rotation platter

1003. In combination with the azimuth stepper motor, the elevation stepper motor and angular encoder 1010 is used to direct the laser range finder at the center of a target using feedback control from the target feedback camera 1011. The elevation angular encoder should be sufficient to measure the elevation angle θ relative to the horizontal plane with precision better than 10 arcsec.

The target feedback camera 1011 can observe the laser range finder illumination spot in the vicinity of the desired target. The observed spot offset from target center enables feedback control to precisely center the laser spot on the target. Data samples from the target feedback camera 1011 are inputs to the micro-controller 1007.

Measurement data samples from the laser range finder 1012 are inputs to the micro-controller 1007.

The stepper motors and leveling platform are controlled by the programmable micro-controller 1007 to achieve the leveling, search and feedback targeting and laser range measuring functions.

The programmable micro-controller 1007 can communicate via a wireless communications module 1008 to a second wireless communications module external to the rotation accessory.

A battery 1006 is capable of providing electrical power to all survey accessory components.

Figure 6:
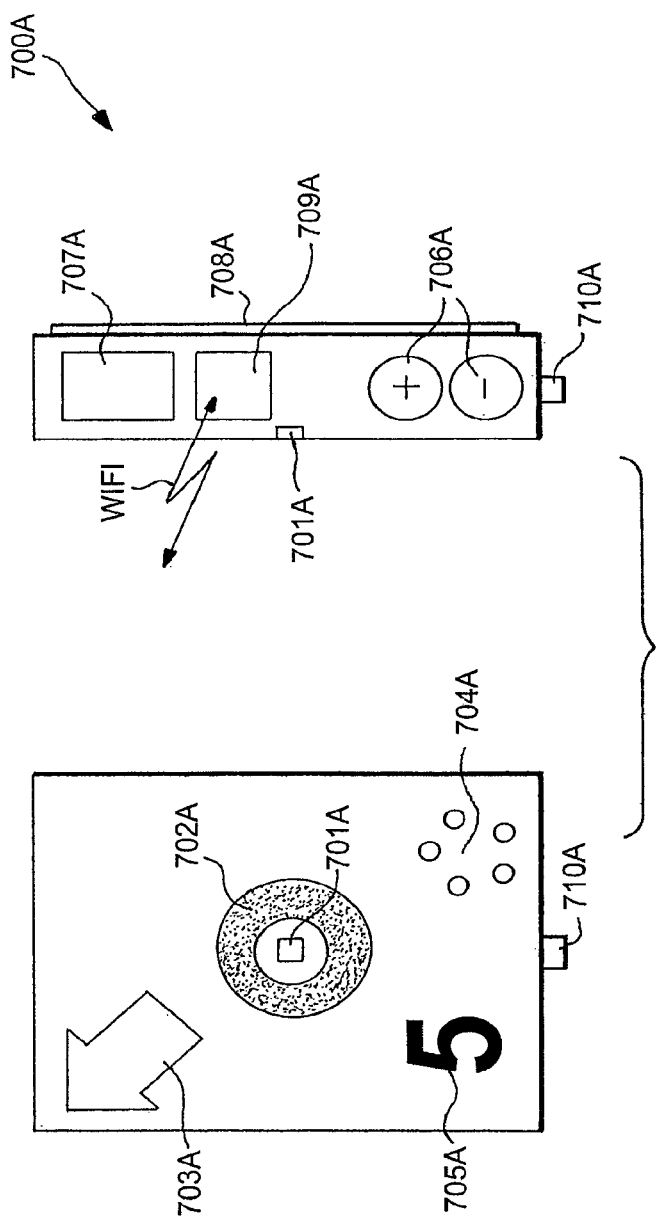
FIG. 6 illustrates an embodiment of an active target of the present invention.

FIG. 6 shows an assembly schematic diagram of an active target 700A. The assembly consists of a circuit board to which are fixed several components, which are listed below.

The active target includes an LED 701A. Ideally, the LED active area is ≤1 mm$^2$ and the radiation power is axially symmetric and uniform as a function of elevation angle.

Surrounding the LED 701A is a reflective annulus 702A. Its function is to facilitate laser targeting and ranging.

A corner that is used to designate a physical feature is marked with a visible arrow 703A.

A target identifier symbol 704A is provided that is machine readable. A target identifier symbol 705A, corresponding to 704A, is provided that is human readable.

Further with respect to target identification, each target has a unique identifier that is used together with an online target database, as will also be further discussed below, to get all relevant information of the position of the target. So, position does not have to be stored in the target, but rather, in the target database that can be accessed.

The unique identifier can be a combination between Target Inbuild Unique Identifier (TIUI)+Target External Identifier (TEI). TEI, without being limited thereto, could be the rough GPS coordinates of the target location. Thus, with that, the range of TIUI can be limited. If rough GPS coordinates can be precise to 1 km and if it can be assumed that inside a 1 km radius there will be less than 1000 targets, only 10 bit of address is required. However, for margin, 12 bit of address is provided for TEI.

Additionally, a Target Type Identifier (TTI) can be provided to distinguish between different types of targets, such as active wall targets, movable targets attached to power tools, targets with inbuilt EDM, etc. Providing for at least 16 different TTI, 4 bit of address is provided. Therefore, a total of 16 bit may be provided for the TIUI unique identifier.

A replaceable or rechargeable or disposable battery 706A is provided that is sufficient to supply electrical power to the target electronics.

Electronics for target modulation 707A are provided. Power level, target code/electromagnetic frequency/duty cycle, etc., are manually settable by switches or equivalent.

An attachment mechanism 708A is provided for attachment of the target. This can be one or a combination of an adhesive, magnetic, suction, etc., mechanism, for example.

A microcontroller 709A with an optional wireless communications module is provided. The microcontroller and communications components are used with a dynamic network of targets. The microcontroller can also be used to switch on/off the target in response to command or work space activity/inactivity.

A port 710A is provided for an external power supply. This can be used for continuous operation in the absence of a battery or to recharge a rechargeable battery.

In an embodiment of a system of the present invention, each of the plurality of active targets are modulated in an on-off sequence at a predetermined frequency and duty cycle or time sequence. The purpose of the modulation is to further enable each target to be uniquely identified from among a plurality of such targets. The power or the duty cycle or the time sequence of each active target can be dynamically changed in response to commands on a wireless communication channel.

The modulation sequence of all targets may be time synchronized so that the time sequences of all targets are in known phasing to each other. In a preferred embodiment, the time synchronization of all targets is achieved by each target sensing the phase of the local AC power distribution network.

In an embodiment, the plurality of cameras are time synchronized with the network of active targets.

Further regarding synchronization, for indoor positioning with active targets, as discussed previously, the pose is calculated by processing images taken by the cameras. Assuming that a time sequence of such images is available, the active targets are designed to facilitate the pose calculation in the absence of other information and in the presence of interference and multipath. Thus, given a region in an image, it is determined if this region is the image of an active target or something other than a target. For example, a small bright region in an image could be a target or could be a reflection of sunlight from a vehicle windscreen thru a window. These processes are called interference detection and interference rejection.

Given a region in an image that has been determined to be an active target, it is determined which active target from a set of known (candidate) targets this image region represents. This process is called target registration.

Further, given a region in an image that has been determined to be a specific target, it is further determined whether the image is a direct optical line of sight to the target or a reflection of the determined target from some sequence of optical surfaces. These processes are called multipath detection and multipath rejection.

To assist in these determinations and these processes, the targets are modulated, as discussed above, and as additionally discussed below.

If it is known, for example, that a target will vary its brightness over time in a known manner, this knowledge can be used to exclude a sunlight glint from consideration as a target. Thus, this simple modulation scheme therefore enables interference detection and rejection. An alternative simple modulation scheme is to change the color of the target transmission over time.

If it is further known that each target varies its brightness or color as a specific and unique function of time, this knowledge can be used to distinguish (disambiguate) between individual targets.

Identifying a region in an image as mapping to a specific target also assists with multipath detection. If more than one region in an image is determined to be a specific target by observing its unique time signature, then all such regions must be considered as potential multipath rather than a direct target image. In this case, additional information or continuity requirements or a combinatorial approach can be used for multipath rejection.

For active targets, as also discussed above, many modulation approaches are contemplated in accordance with the principles of the present invention. As discussed, a simple modulation scheme is ON/OFF at a particular temporal frequency and duty cycle. Another simple temporal modulation scheme is amplitude modulation at a particular temporal frequency, where the brightness changes over time but the target is continually ON. Yet another is the variation of color (optical frequency). Yet another is a sequence of temporal frequencies or some combination of these techniques.

"High frequency target modulation" is defined to mean target modulation at a frequency greater than the camera frame rate. In this case, the cameras are not able to be used to observe the target modulation variations. For example, in the case of several targets temporally modulated at 1 kHz, a camera running at approximately 10 Hz frame rate cannot distinguish between these targets. In this case, additional sensors such as Position Sensitive Detectors (PSDs) or photodiodes, discussed previously, can be used to disambiguate among the targets by analog signal processing.

"Low frequency target modulation" is defined to mean target modulation at a frequency equal to or less than the camera frame rate. In this case, the camera images can be used to observe target modulation variations directly.

Henceforth, the below discussion is directed to the case of "low frequency target modulation".

Consider a plurality of targets, where each target is modulated by a unique time sequence of color and amplitude (i.e., power) at a given base frequency, where the base frequency is limited by the definition of "low frequency target modulation". This sequence of color and amplitude "symbols" are repeated continuously, with each cycle possibly including a preamble or parity check.

A unique code is defined to be the pre-defined time sequence of color and amplitude symbols.

The number of unique codes is defined by the length of the code sequence before repetition.

For the pose determination, there is a trade off between the number of targets that can be discriminated (disambiguated) and the number of images it takes to complete the discrimination process. Increasing the camera frame rate will decrease the length of time required for a given code length.

A related issue is the alignment between the camera(s) exposure interval and the target(s) symbol phasing.

In an embodiment, all cameras are synchronized to each other by means of a hardware signal or trigger, as discussed previously and as shown in FIG. 3. This ensures that images from all cameras are time aligned.

In an embodiment, all targets are synchronized to each other, so that the phasing of code symbols from all targets in the network are aligned in time. As a further refinement (assuming all targets employ an equal length code), it can be enforced that the start of the code repetition interval from all targets in the network are aligned in time. This refinement enables the observation of any target to indicate the code phasing of all other targets to be inferred without having to wait for all targets to complete their code sequence. This in turn minimizes the overall time to complete the disambiguation process. Unlike GPS code phases, timing delays due to "time of flight" are not important in this application.

For the purposes described, target synchronization requires symbol phase alignment to only approximately 10% of the period associated with the camera frame rate. This level of precision can easily be achieved by several means described below.

A final related issue is the synchronization of the camera (s) exposure interval and the symbol phasing of the target network. For example, if the camera time base could slide relative to the target time base, eventually the camera exposure interval would span the symbol transition time of the targets. To avoid this problem, the camera exposure time base can be aligned with the time base of the target network, as also previously discussed.

Thus, in a first embodiment, camera and/or target network synchronization is achieved by each target observing the phase of the electrical power supply grid variations.

In a second embodiment, camera and/or target network synchronization is achieved by each target observing an intermittent optical or a radio frequency pulse.

In a third embodiment, camera and/or target network synchronization is achieved by each target receiving a timing or synchronization packet from a wired or wireless synchronization server.

Further with respect to the targets, as disclosed previously, the targets may also be projected target images. In a preferred embodiment, the projected target images are laser dots or lines in a known configuration, for example, a projected laser plane that is known to be aligned with, or orthogonal to, the local gravity vector.

Figure 7:
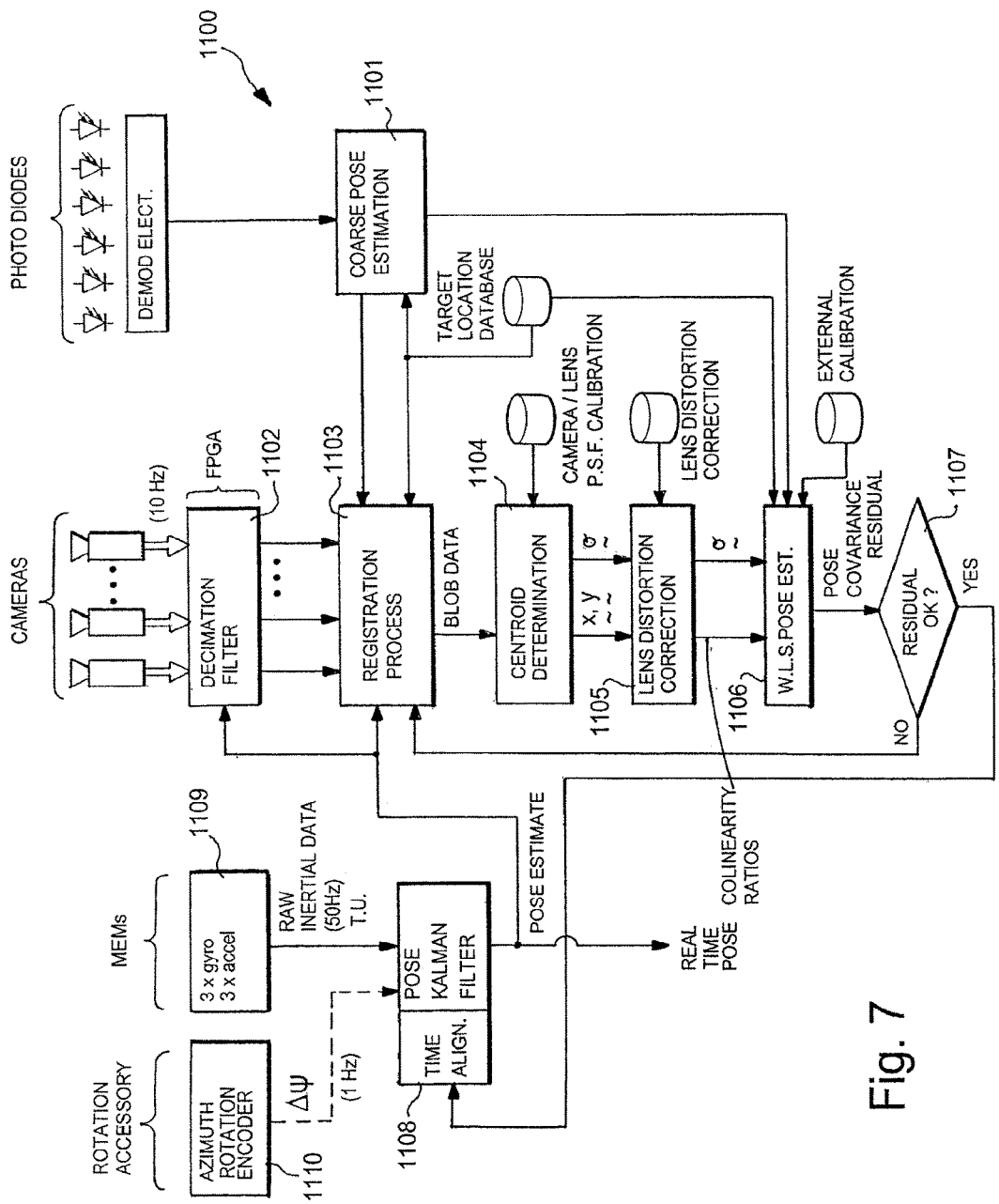
FIG. 7 illustrates an embodiment of a method for the operational mode of the POME system.

FIG. 7 shows a method 1100 for the operational mode of the POME system. The drawing illustrates the data flows from the sensors and the infrastructure/calibration inputs and how these are processed to create real time pose estimates using algorithms, hardware and software modules.

The data flow associated with the POME head assembly alone is discussed first, and subsequently, the optional addition of a rotation accessory in the static mode is discussed.

In addition to real time signals, there are four (4) additional sources of information that are specific to the POME head assembly and to the infrastructure installation. These are described below.

(1) The target location database. The target location database, as mentioned previously, is a per working volume list of targets that are present in the working volume and attribute data associated with each target. The target location database may be static or may be updated in real time via wireless communications. Without limiting, the following list of target attributes are of interest:
  (a) indicate target type; active or passive or projected;
  (b) enabled or disabled or battery status;
  (c) dynamic or non-dynamic;
  (d) optical wavelength of transmission; includes IR and visible spectrum wavelengths;
  (e) modulation type and identifier, e.g., duty cycle, modulation frequency, modulation code identifier, synchronization type, synchronization status;
  (f) boolean, if identifies a workspace fiduciary point;
  (g) the target location coordinates in the defined coordinate frame;
  (h) the target location uncertainty (covariance) in the defined coordinate frame; and
  (i) the human readable and/or machine readable target identifiers.

(2) The camera/lens point spread function (P.S.F.) calibration. The per camera/lens P.S.F. calibration is data from the calibration procedure related to the shape of the impulse response at all locations of the image plane. This data is used in the centroid determination algorithm.

(3) The lens distortion correction. The per camera/lens distortion correction are the pair of 2D error functions of image plane coordinates and the parameters of the idealized mathematical model used in the calibration step. These data are the output of the calibration procedure. The 2D functions are used to correct the image plane locations to those of a mathematically idealized model. These data are necessary to convert from image plane locations to camera relative ray angles.

(4) The external calibration. The external calibration is for the POME head assembly, and relates the position and orientation of each of the sensors relative to the POME assembly frame. These data are the output of the calibration procedure and are necessary inputs to the W.L.S. pose estimation.

In continuing with the discussion of the data flow associated with the operational mode, Coarse Pose Estimation is illustrated in process step 1101. Active target signals are sensed by the photodiodes and the photodiode electronics are used to demodulate signals from all targets in the photodiode field of view. This allows the micro-controller to determine which targets among the set of active targets are observed by each photodiode in the array. Combined with the known photodiode field of view relative to the POME assembly frame and the coarse angular resolution of each photodiode and the target database, this information is used to calculate coarse position and orientation (pose) estimates of the POME head assembly.

Decimation Filter process step 1102. For each camera, the data rate is given by $$\#pixels * \frac{frames}{second} * \frac{bits}{pixel}.$$

For example, considering a 5 Mpix camera operating at 10 Hz with 16 bits per pixel, this amounts to 800 million bits per camera per second. Of this data, the regions of interest (ROI) around the targets will typically represent less than 5% of the total data. To remove extraneous or unnecessary or corrupted data, a decimation filter is employed. In a preferred embodiment, the decimation filter is implemented in hardware, for example, in an FPGA. As further disclosed in FIG. 2, the decimation filter is implemented in the electronics 5 for data decimation of the POME head assembly 100. The raw or spatially filtered pixel intensity samples are compared with a threshold. The threshold may be a function of the image plane location and may be dynamically modified under computer control. If the threshold is exceeded, a region of interest about the image plane point is extracted together with the offset of the ROI relative to the image plane origin. All other pixel data is discarded. The decimation filter results in a dramatic reduction in the volume of data that must be handled in subsequent computational steps. The output of the decimation filter is the set of regions of interest and the offset data for each. This decimated data is passed to the micro-controller 7 of the POME head assembly 100 and subsequent processing steps are implemented in software.

Registration Process step 1103. Given a collection of regions of interest, each containing an image space blob, (i.e., the output of the decimation filter), registration is the process of associating the set of image space blobs in the regions of interest with the set of targets that are the source of the blob energy. It is also necessary to detect and remove interference sources that are not targets and reflections of targets from internal surfaces, as also discussed previously. The coarse pose estimate and the target location database are used to geometrically limit the set of registration candidates. In some cases some uncertainty may remain in the association of target identifiers with image space blobs. In this case a small number of candidate associations may need to be tested in the W.L.S. pose estimation and the lowest residual candidate selected. The potential for this selection process is indicated by the "Residual OK?" feedback loop after the W.L.S. pose estimation step, to be further discussed below. The output of the registration process is a set of image space blob data that are associated with a set of targets with known target locations. Some targets may be visible to more than one camera and some targets may not be visible by any camera.

Centroid Determination process step 1104. Given a blob in a region of interest, the image plane coordinates of the blob centroid is determined. The blob shape is a function of the image plane location and is in general non-convex and asymmetric. The lens point spread function (P.S.F.) calibration is the set of blob shapes that were recorded during the calibration process for all locations in the image plane. This recorded data is used in the centroid determination process. In a preferred embodiment, the process involves least squares fitting of the data blob with the reference blob from the image plane locality. The output of the centroid determination process is a vector of image plane x locations and a vector of image plane y locations in units of pixels. Additionally, a vector of one sigma standard deviation values σ is generated. The standard deviation vector is determined by an error model, the parameters of which are determined in the calibration process. For each measurement, the standard deviation will depend on the observed signal level, the presence or absence of saturation, the distance and obliquity to the target, and the location of the blob in the image plane.

Lens Distortion Correction process step 1105. Lens distortion correction uses the per camera/lens 2D distortion correction functions to correct the set of determined centroid locations. The 2D distortion correction functions were generated during the calibration process. The corrected centroid locations are used together with the idealized projection model to infer colinearity ratios for the set of targets. The output of the lens distortion correction process is a set of colinearity ratios, each associated with a target identifier and a vector of standard deviation values σ, one for each measurement. Each camera can output its internally measured temperature. This allows 2D lens distortion correction functions to be recorded at several constant temperature points during calibration. In a preferred implementation, the 2D lens distortion correction function values used during operation are the interpolated values from calibration tables that straddle the measured temperature at the camera.

Weighted Least Squares Pose Estimation process step 1106. For the pose estimation step, the inputs are the target location database, the external calibration data, the coarse pose estimate or kalman filter pose estimate and the colinearity ratios and standard deviation values for all registered targets. The data processing involves a non-linear weighted least squares (W.L.S.) optimization to find the six parameters of the assembly frame pose in the defined reference frame and variance bounds on these parameter estimates. In addition to the pose and variance estimates, a residual vector is calculated which indicates the degree to which the measurement data are consistent with the pose estimate. The results are time stamped at the center of the camera exposure interval from which the camera data were derived. Algorithmic issues such as divergence, singularity or convergence to an incorrect result are possibilities. For this reason, a starting estimate from the pose Kalman filter or the coarse pose estimation process may be used to initialize the W.L.S. estimation step. In a preferred implementation, the external calibration data values used during operation are the interpolated values from external calibration results taken at temperatures that straddle the measured temperature of the POME head assembly.

Registration Candidate Iteration. If targets have been incorrectly registered in the registration step, this can be detected after the W.L.S. estimation step by examining the residual vector and by comparing the W.L.S. result to the coarse pose estimate and/or the kalman filter state. If the result is determined to be invalid, another registration candidate can be processed as indicated by the "residual OK" loop 1107. The best candidate can be selected, or if all candidates fail, the process can be aborted.

Pose Kalman Filter process step 1108. A kalman filter (KF) is a well known algorithm for combining data from various measurements, with potentially misaligned timestamps and with varying measurement uncertainty. The KF is typically implemented as a sequence of time update (T.U.) and measurement update (M.U.) steps. In a preferred implementation, high data rate measurements from the inertial package (step 1109) are used in T.U. steps to propagate the pose estimate forward in time, and to increase in pose covariance over this propagation interval. Lower rate results from the W.L.S. pose estimation are used in M.U. steps to refine the KF state and to reduce the pose uncertainty when valid results from the W.L.S. pose estimation become available.

During kinematic operation, it is possible that camera measurements will be blocked for a period of time or that the angular rate will become too high for camera measurements to be used. During such intervals, the propagation of the KF orientation state can remain valid for some minutes if the gyro biases have been calibrated during a preceding time interval. During such intervals, the propagation of the KF position state will diverge (become invalid) within a few seconds due to the double integration of erroneous accelerometer measurements. To re-initialize the system after such an interval, the coarse pose estimate from photodiode samples coupled with the orientation state of the KF can be used to achieve instantaneous registration with high reliability.

Thus, in accordance with the principles of the present invention and in an embodiment, the pose of the object is determined at the conclusion of the W.L.S. Pose Estimation step. However, as discussed above, this pose determination may become inaccurate if the frame assembly moves, e.g., in the kinematic mode. In this circumstance, the pose of the object may be further computed using the Pose Kalman Filter process step, discussed above. Thus, a "real time" pose can be further computed in the kinematic mode by dead reckoning, i.e., propagating the pose based on kinematics of the POME head assembly.

Further with respect to the operational mode, the functions of FIG. 7, other than those of the decimation filter and the hardware components of the rotation accessory, the MEMs, and the photodiodes, are performed by the microcontroller 7 of the POME head assembly 100. The microcontroller can be programmed to perform these computation functions of the POME head assembly.

Static Mode. In the static mode, as discussed previously, the POME head assembly is mounted on a rotation accessory at a location in the working volume. The inertial and camera measurements can be used to determine that the POME head assembly is stationary. Automatic mode selection and switching is also possible. The rotation accessory is used to rotate the POME head assembly about a vertical axis in azimuth increments. As a non-limiting example, a rotation increment of five degrees every second would be reasonable. During the stationary periods between rotation increments, camera data is captured from all targets in view. These camera data are used to generate W.L.S. pose measurements as described in detail above. The KF is updated by the W.L.S. pose estimate and also by the azimuth rotation increments from the rotation accessory (step 1110; FIG. 7). As a non-limiting example, measurements of azimuth rotation increments $\Delta\psi$ would be injected into the KF at one second intervals.

Figure 8:
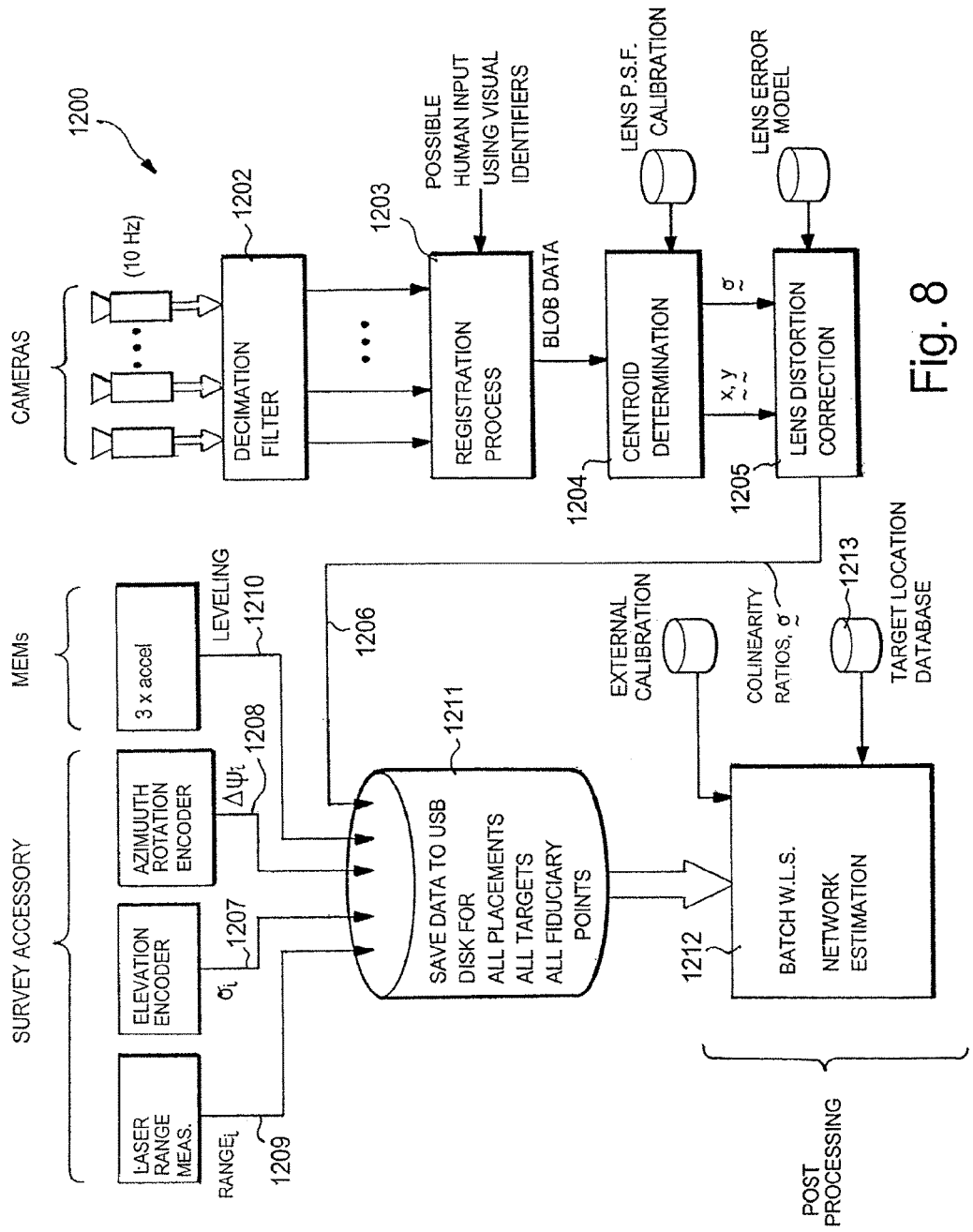
FIG. 8 illustrates an embodiment of a method for the survey mode of the POME system.

FIG. 8 shows the method for the survey mode of the POME system. In the survey mode, a set of targets is surveyed into the coordinate frame. As will be further discussed below, a set of target image measurements from the POME head assembly are augmented with accurate laser range measurements to the targets. Thus, the totality of these measurements are sufficient to calculate the set of target locations with high accuracy.

FIG. 8 illustrates the data flows from the sensors and calibration inputs and how these are processed to create the target location database in a batch post processing step. The batch process uses data captured to disk from sensors on both the POME head assembly and the survey accessory and for potentially several separate placements of the assembly of the POME head assembly and survey accessory.

In an embodiment of the survey mode, the assembly of the POME head assembly and the survey accessory (the survey assembly) is placed by the user in the workspace at a location where several targets or fiduciary points are visible to the POME head assembly. The objective is to collect camera measurements of all targets and also range measurements to all targets and fiduciary points using the laser ranging component of the survey accessory. It may be necessary to move the survey assembly to several locations to ensure that all targets and fiduciary points are sampled. This will occur if the workspace has an irregular shape or has many line of sight blockages.

To achieve a laser range measurement, it is necessary to first align the optical axis of the laser with the center of the target or fiduciary point to be measured. The alignment step is facilitated by the target feedback camera with a narrow field of view that is aligned with the laser beam and sensitive to the laser wavelength. The laser spot visibility is also enhanced by the reflective ring around the center of each target. The targeting function can be done under manual control or can be automated using computer control. In addition to the laser range measurement, the azimuth and elevation angles from the angular encoders are recorded. The azimuth angle measurement is relative to an unknown starting point. The elevation angle measurement is relative to the horizontal plane. During data collection, the vertical rotation axis is aligned with the local gravity vector by a self leveling function. Accelerometer data from the POME head assembly may be saved for the purpose of determining local level or for estimating the accelerometer biases.

FIG. 8 shows the processing of camera and laser ranging and encoder data thru various algorithms, hardware and software. The camera and decimation filter 1202 blocks are identical to those described for the operational mode. The registration process 1203 differs because the target location database is not available but the general direction and identification of targets remains possible using demodulated target signals from the photodiode array.

The output of the registration process is again an association between a set of target blobs and target identifiers. Human interaction to identify and manually target fiduciary points in the workspace may be required if such points are not instrumented with active targets. The centroid determination 1204 and lens distortion correction 1205 steps are identical to those described in the operational mode.

At each placement of the survey assembly, and for each target and each fiduciary point in view, the following data are recorded to disk 1211:

1. camera measurements to all targets in view 1206;
2. elevation angle measurement 1207;
3. azimuth angle measurement 1208; and
4. laser range measurement 1209.

The accelerometer data 1210 from the POME head assembly may also be saved for the purpose of determining local level or for estimating the accelerometer biases.

After the data collection is complete, a separate batch process 1212 is used to process the collected data. The output of the batch processing is the target location database 1213 together with the uncertainty estimates for each target location.

The functions of FIG. 8, other than those of the decimation filter and the hardware components of the survey accessory and the MEMs, can be performed by the micro-controller 7 of the POME head assembly 100 and/or the micro-controller 1007 of the survey accessory. The micro-controllers can be programmed to perform these computation functions.

Figure 9:
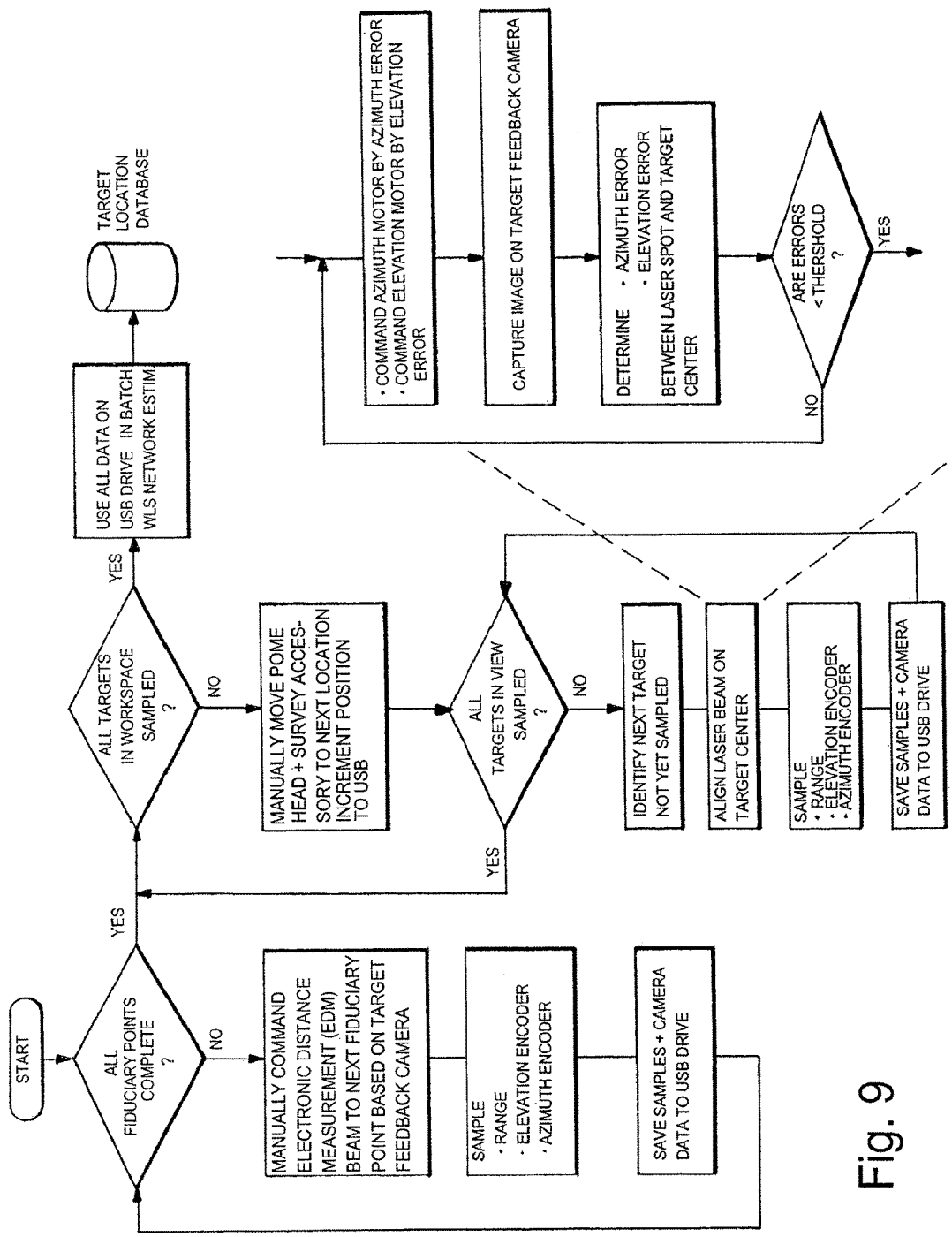
FIG. 9 further illustrates the method for the survey mode including survey mode data collection and automation.

FIG. 9 is a flow chart to further illustrate the method for survey mode data collection and automation. The first column shows steps that require manual interaction to identify and target the set of fiduciary points. Fiduciary points are known points in the workspace that are used to tie the target locations to the workspace coordinate frame. A minimum of 2 fiduciary points are required.

The second column shows steps that are used to identify and collect range measurements for the set of active targets. The detailed steps required for computer automation of the laser targeting and ranging using optical feedback are shown in the third column.

Figure 10:
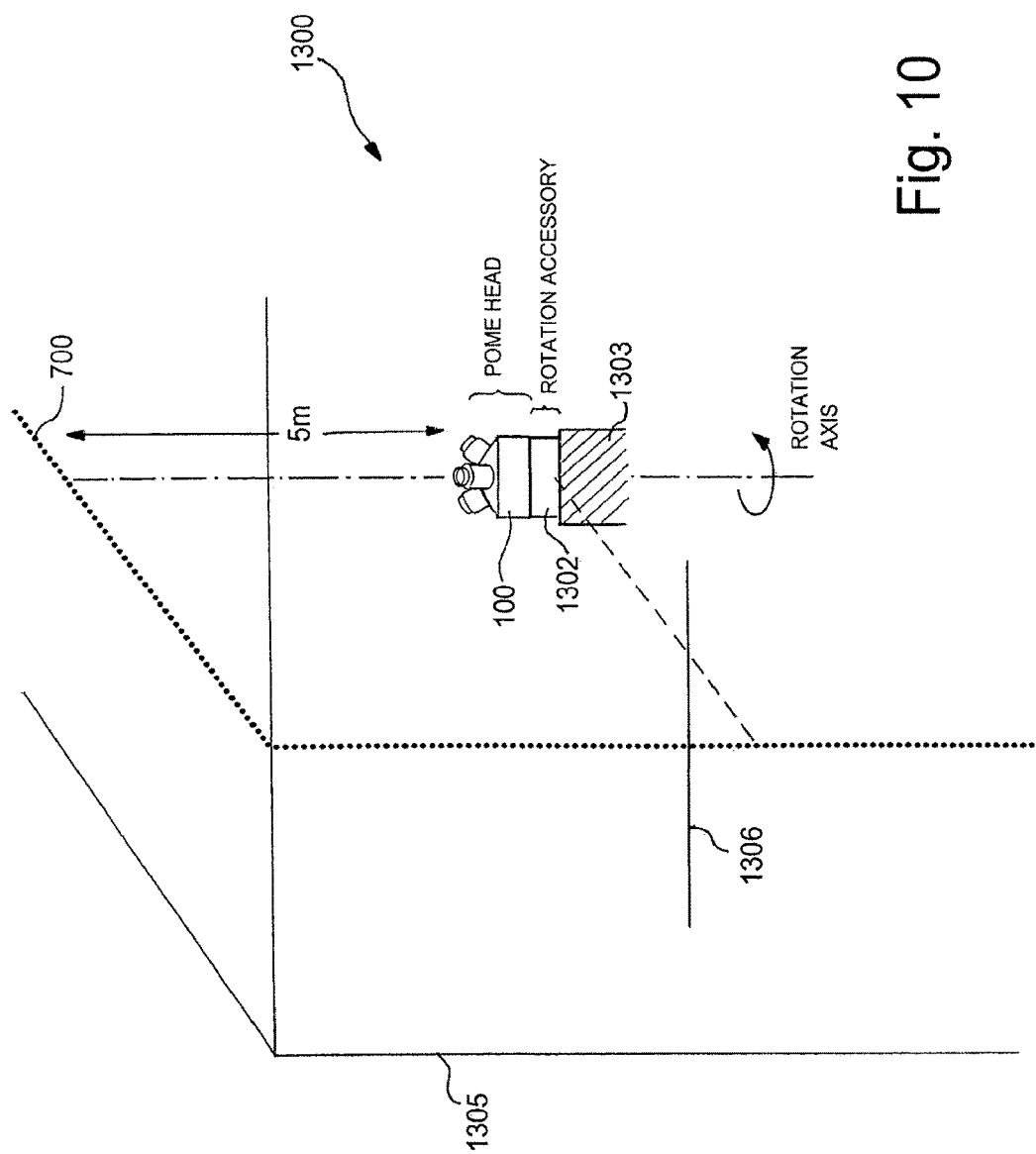
FIG. 10 illustrates an embodiment of a POME calibration fixture of the present invention.

FIG. 10 shows a diagram of a POME calibration fixture 1300. The fixture consists of a stable platform 1303 and a stable/rigid structure 1305. A large number of targets 700 are mounted on the stable structure at known locations relative to the stable platform origin. In a preferred embodiment, the set of targets are constrained to a plane that exceeds the field of view limits of the cameras as the cameras are rotated about an axis. The targets are populated sufficiently close together to create a dense array of target blobs in a camera image. The size of the fixture is designed to ensure that the targets are sufficiently small such that they can be characterized by their point spread function. The sampled point spread function is recorded at all locations in the image plane and is used during the operational mode in the centroid determination process.

The targets 700 may be active or passive. Passive targets may be externally illuminated in a controlled manner.

In addition to the active and passive targets described, a set of projected targets may be employed. Projected target images may have any form. In a preferred embodiment, the projected targets are points and lines that result from projecting laser beams and laser fans onto planar surfaces, as discussed previously. For example, a horizontal laser line 1306 is achieved by projecting a leveled laser fan beam of the POME head assembly onto a planar surface.

To achieve calibration, a POME head assembly 100 to be calibrated is mounted with a rotation accessory 1302 (rotation accessory 500 of FIG. 4) on the stable platform 1303. The POME head assembly is rotated about the vertical axis under computer control in small increments. At each station, camera data and the azimuth angle measurement are saved to disk.

In a preferred embodiment, the calibration assembly (POME head assembly 100 and rotation accessory 1302) is enclosed within a thermally controlled chamber. The chamber has a slot to allow visibility of the array of targets. By performing the calibration procedure at two or more controlled temperatures, several calibration data sets can be recorded. In the operational mode, the calibration data used should be the interpolated data from two data sets that straddle the operational temperature.

Figure 11:
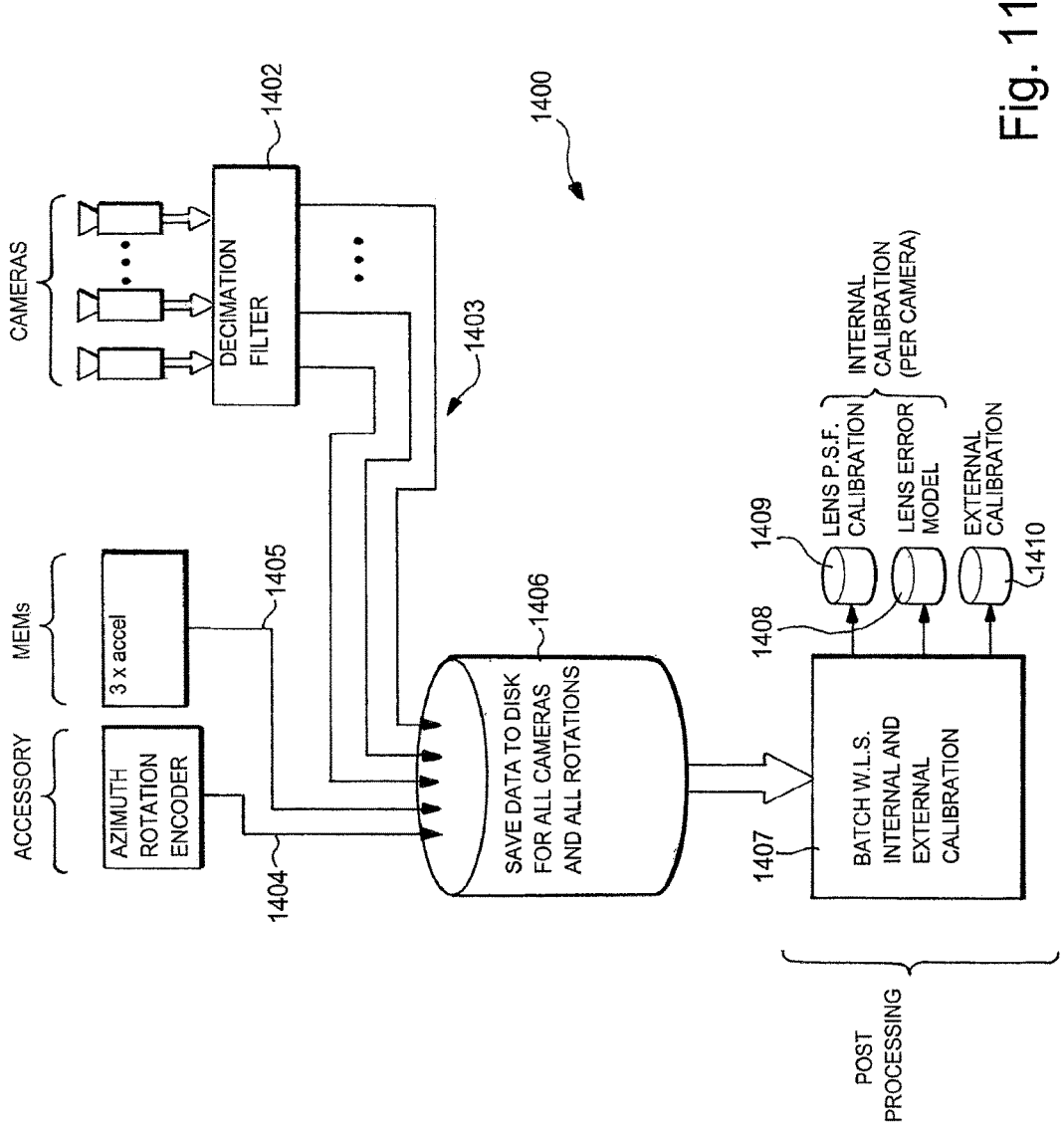
FIG. 11 illustrates an embodiment of a method for POME head assembly calibration.

FIG. 11 shows a method 1400 for the POME head assembly calibration function. The drawing illustrates the data flows from the sensors and target location inputs and how these are processed to create the per camera internal calibration and the POME head assembly external calibration. The batch process uses data captured to disk from the sensors on both the POME head assembly and the rotation accessory.

For calibration, the assembly of the POME head 100 and rotation accessory 1302 is placed on the stable platform 1303. During data collection, the vertical rotation axis is aligned with the local gravity vector by an automated leveling function. Accelerometer data from the POME head assembly may also be saved for the purpose of determining local level or for estimating the accelerometer biases and orientation errors. As the POME head assembly is rotated in small increments about the vertical rotation axis, the field of view of each camera is sequentially rotated thru the vertical plane where the targets are populated. The summation of all images is sufficient to sample the image plane of each camera over the entire field of view.

FIG. 11 shows the processing of camera and encoder data thru various algorithms, hardware and software. The camera and decimation filter 1402 blocks are identical to those described for the operational and survey modes. The registration process is not shown because the association between targets and blobs is straightforward to determine based on the geometry and azimuth measurement. The registration step is done as part of the subsequent batch processing.

For each station in the rotation sequence the following data are recorded to disk 1406:

1. the regions of interest about each blob for all targets in view 1403;
2. azimuth angle measurement 1404; and
3. inertial measurements 1405.

After the data collection is complete, a separate batch process 1407 is used to process the collected data. The output of the batch processing is:

1. the internal calibration for each camera including:
   (a) lens error model 1408, including:
      i. idealized projection model parameters;
      ii. x and y 2D distortion correction functions;
   (b) lens P.S.F. calibration 1409; and
2. the external calibration for the POME head assembly 1410.

In a preferred implementation, these data are recorded at two or more stable temperatures.

The functions of FIG. 11, other than those of the decimation filter and the hardware components of the rotation accessory and the MEMs, can be performed by the micro-controller 7 of the POME head assembly 100 and/or the micro-controller 57 of the rotation accessory 500/1302. The micro-controllers can be programmed to perform these computation functions.

Further regarding a calibration process of the present invention, in an embodiment, a set of image plane measurements are used to estimate theodolite angles based on a calibrated lens model. The estimated theodolite angles are then directly compared with the accurately measured pan and tilt angles of the cameras. Thus, in contrast to image plane residuals, this allows the effects of measurement noise, interpolation error, and inverse projection non-linearity to be directly measured rather than estimated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for determining a position and an orientation of an object in a working volume relative to a defined reference frame of the working volume, comprising:
   a plurality of targets disposed at known locations relative to the defined reference frame, wherein the plurality of targets are attached to, or projected on to, internal surfaces of the working volume; and
   a head assembly disposed on the object, wherein the head assembly includes a plurality of cameras;
   wherein the position and the orientation of the object relative to the defined reference frame is determinable by the head assembly from location data associated with the plurality of targets in the defined reference frame and image data from the plurality of cameras in an assembly frame of the head assembly.

2. The system according to claim 1, wherein the plurality of targets are active targets, passive targets, or projected targets.

3. The system according to claim 2, wherein the projected targets are laser dots or lines in a known configuration.

4. The system according to claim 1, wherein the plurality of targets are active targets and wherein each of the plurality of active targets is modulated in an on-off time sequence at a predetermined frequency and duty cycle or time sequence.

5. The system according to claim 4, wherein a power or the duty cycle or the time sequence of each of the plurality of active targets is dynamically changeable in response to a command on a wireless communication channel.

6. The system according to claim 1, wherein a modulation sequence of the plurality of targets is time synchronized.

7. The system according to claim 6, wherein the modulation sequence is based on a sensing of a phase of an alternating current power distribution network.

8. The system according to claim 6, wherein the plurality of cameras are time synchronized with the plurality of targets.

9. The system according to claim 1, wherein the plurality of targets are modulated using low frequency modulation with a set of predefined codes.

10. The system according to claim 1, wherein the head assembly includes a plurality of photodiodes and wherein the photodiodes sense a signal from at least one of the plurality of targets.

11. The system according to claim 1, wherein the head assembly includes an inertial measurement sensor.

12. The system according to claim 1, wherein the location data associated with the plurality of targets is obtained from a target location database and wherein the image data from the plurality of cameras are image space blobs.

13. The system according to claim 1, wherein the image data from the plurality of cameras is image data processed by a decimation filter and wherein the processed image data is a set of regions of interest with each region of interest containing an image space blob.

14. The system according to claim 1, further comprising a rotation accessory, wherein the head assembly is connected to the rotation assembly.

15. The system according to claim 14, wherein the rotation accessory includes:
   a rotation platter;
   an azimuth motor with a shaft that is connected to the rotation platter and an azimuth angle encoder for the shaft;
   a self-leveling platform, wherein the self-leveling platform aligns a rotational axis of the azimuth motor with a local gravity vector; and
   a micro-controller, wherein the micro-controller controls the azimuth motor and the self-leveling platform and receives a signal from the azimuth angle encoder.

16. The system according to claim 15, further comprising:
   an elevation platform;
   an elevation motor with a shaft that is connected to the elevation platform and an elevation angle encoder for the shaft, wherein the shaft is disposed in a horizontal plane by the self-leveling platform of the rotation accessory;
   a laser range finder attached to the elevation platform such that an optical axis of the laser range finder is orthogonal to the shaft of the elevation motor; and
   a target feedback camera attached to the elevation platform such that an optical axis of the camera is aligned with the optical axis of the laser range finder and wherein the camera is sensitive at a wavelength of the laser range finder.

17. The system according to claim 15, further comprising a stable base and a rigid enclosure, wherein the plurality of targets are disposed in known positions relative to the stable base.

18. A method for determining a position and an orientation of an object in a working volume relative to a defined reference frame of the working volume, comprising the steps of:
   disposing a plurality of targets at known locations relative to the defined reference frame, wherein the plurality of targets are attached to, or projected on to, internal surfaces of the working volume;
   receiving image data from a plurality of cameras at a head assembly disposed on the object relative to an assembly frame of the head assembly;
   receiving location data associated with the plurality of targets relative to the defined reference frame at the head assembly; and
   determining the position and the orientation of the object by the head assembly from the received image data in the assembly frame and location data in the defined reference frame.

19. The method according to claim 18, wherein the plurality of targets are active targets, passive targets, or projected targets.

20. The method according to claim 18, wherein the head assembly includes a plurality of photodiodes and further comprising the step of sensing a signal by the photodiodes from at least one of the plurality of targets.

21. The method according to claim 18, wherein the head assembly includes an inertial measurement sensor.

22. The method according to claim 18, wherein the location data associated with the plurality of targets is received from a target location database and wherein the image data from the plurality of cameras are image space blobs.

23. The method according to claim 18, wherein the head assembly is connected to a rotation accessory.

24. The method according to claim 23, wherein the rotation accessory includes:
a rotation platter;
an azimuth motor with a shaft that is connected to the rotation platter and an azimuth angle encoder for the shaft;
a self-leveling platform, wherein the self-leveling platform aligns a rotational axis of the azimuth motor with a local gravity vector; and
a micro-controller, wherein the micro-controller controls the azimuth motor and the self-leveling platform and receives a signal from the azimuth angle encoder.

25. The method according to claim 24, further comprising:
an elevation platform;
an elevation motor with a shaft that is connected to the elevation platform and an elevation angle encoder for the shaft, wherein the shaft is disposed in a horizontal plane by the self-leveling platform of the rotation accessory;
a laser range finder attached to the elevation platform such that an optical axis of the laser range finder is orthogonal to the shaft of the elevation motor; and
a target feedback camera attached to the elevation platform such that an optical axis of the camera is aligned with the optical axis of the laser range finder and wherein the camera is sensitive at a wavelength of the laser range finder.

26. The method according to claim 24, further comprising a stable base and a rigid enclosure, wherein the plurality of targets are disposed in known positions relative to the stable base.

* * * * *